(12) United States Patent
Jones et al.

(10) Patent No.: US 6,601,449 B1
(45) Date of Patent: Aug. 5, 2003

(54) SELF-REGULATING BUBBLE TUBE ASSEMBLY

(76) Inventors: Derrick A. Jones, 4094 Lilly Rd., Hazlehurst, MS (US) 39083; Thomas R. Ray, 501 Marion Ave., Crystal Springs, MS (US) 39059

( * ) Notice: Subject to any disclaimer, the term of this patent is extended or adjusted under 35 U.S.C. 154(b) by 0 days.

(21) Appl. No.: 10/140,357

(22) Filed: May 6, 2002

Related U.S. Application Data

(60) Provisional application No. 60/293,128, filed on May 24, 2001.

(51) Int. Cl.[7] .............................................. G01F 23/14
(52) U.S. Cl. ............................. 73/299; 73/299; 73/302; 73/439
(58) Field of Search ......................... 73/299, 439, 302

(56) References Cited

U.S. PATENT DOCUMENTS

| | | | | |
|---|---|---|---|---|
| 3,460,394 A | * | 8/1969 | Cryer | 73/439 |
| 3,613,456 A | * | 10/1971 | Hopfe et al. | 73/439 |
| 4,291,575 A | * | 9/1981 | Frissora | 73/302 |
| 4,393,705 A | | 7/1983 | Eidschun | |
| 4,669,309 A | * | 6/1987 | Cornelius | 73/299 |
| 4,694,692 A | | 9/1987 | Brown et al. | |
| 5,636,547 A | * | 6/1997 | Raj et al. | 73/299 |
| 6,220,091 B1 | * | 4/2001 | Chen et al. | 73/302 |

* cited by examiner

Primary Examiner—Daniel S. Larkin
Assistant Examiner—André K. Jackson
(74) Attorney, Agent, or Firm—James W. Miller

(57) ABSTRACT

A self-regulating bubble tube assembly is used for determining the hydrostatic pressure exerted by fluids, such as drilling mud. The bubble tube assembly can be used to determine fluid level based upon said hydrostatic pressure and when bubble tubes are used in pairs can be used to determine a pressure differential that will indicate the density of the fluid. The bubble tube assembly comprises a flow of air directed through a diaphragm type pressure regulator. The pressure regulator output is connected to the bubble tube, which is partially submerged in the fluid, through a precision, in-line, flow limiting orifice. A feedback line from the bubble tube runs to one side of the diaphragm of the pressure regulator where the back pressure from the tube will regulate the output pressure from the regulator to maintain a pre-selected constant rate of air flow through the bubble tube. Hydrostatic pressure exerted by the liquid is measured from a line leading from the bubble tube to a pressure sensitive meter or the like.

14 Claims, 4 Drawing Sheets

SELF-REGULATING BUBBLE TUBE ASSEMBLY

CROSS REFERENCE TO RELATED APPLICATIONS

This application claims the benefit of one or more previously filed copending provisional applications identified as follows: Application Ser. No. 60/293,128, filed May 24, 2001.

TECHNICAL FIELD

This invention relates to a bubble tube assembly used to determine the level and density of fluids held within a tank or other vessel. More particularly, this invention relates to a method and apparatus for a maintaining a constant air flow rate in bubble tubes that are used to measure the hydrostatic pressure exerted by fluids.

BACKGROUND OF THE INVENTION

A bubble tube assembly is a device used to measure the hydrostatic pressure of a fluid. A typical bubble tube assembly according to the prior art is shown in FIG. 1.

Referring to FIG. 1, a bubble tube assembly comprises a vertically mounted bubble tube 2 having an open lower end that is immersed beneath the surface of a fluid. An adjustable regulator 1 is connected to the top of bubble tube 2 for supplying a pressurized flow of air to bubble tube 2. Regulator 1 is adjusted until regulator 1 supplies a flow of pressurized air to the top of bubble tube 2 that is sufficient to cause air bubbles to begin to escape from the open lower end of bubble tube 2. A pressure measurement device 3, such as a pressure transducer, meter, manometer or the like, is connected to tube 2 to measure the air pressure within tube 2. The pressure at which air bubbles begin to escape from the open lower end of bubble tube 2 is observed, reported and/or recorded since this air pressure is equal to the hydrostatic pressure exerted by the fluid at the lower end of bubble tube 2.

Once the hydrostatic pressure exerted by the fluid at the lower end of bubble tube 2 is known by virtue of the pressure reading from pressure measuring device 3, this pressure information can be used to easily calculate the depth of immersion of the open lower end of bubble tube 2 within the fluid, provided the density of the fluid is known, as well as the level of the fluid within a tank or other vessel. Moreover, bubble tubes 2 can be used in pairs with one bubble tube 2 being longer than the other and with the distance between the open lower ends of the pair of bubble tubes 2 being known. The pressure differential between the pressures in the pair of bubble tubes 2 can then be used to calculate the density of the fluid. U.S. Pat. Nos. 4,393,705 and 4,694,692, both of which are hereby incorporated by reference, disclose the latter described use of a pair of bubble tubes within a fluid to determine both the level of a fluid and the density or specific gravity of the fluid.

Bubble tube assemblies have been proposed for determining the level and density of various fluids where the values for these parameters may vary significantly and where accuracy is important. Such applications include the fluid levels and densities of sulfuric acid in a flooded lead-acid battery as used in telecommunications of the fluid levels and densities of drilling mud used in the oil and gas well drilling industries. For example, U.S. Pat. No. 4,694,692 discloses use with respect to drilling mud.

Unfortunately, the levels and densities of these types of fluids may fluctuate widely, which necessitates frequent manual adjustments to the airflow to the bubble tubes. For example, the hydrostatic pressure exerted by one inch of fluid is much less than that exerted by eight feet of fluid, and the pressure needed to measure a fluid having a density of 20 pounds per gallon is much greater than that needed to measure a fluid having a density of 8 pounds per gallon. Thus, unless carefully watched and manually adjusted, the air pressures applied to the bubble tubes may be either too high or too low at various times, thus preventing one from obtaining consistently accurate readings. Since the oil well drilling industry also requires accuracy to within one tenth of an inch of water of hydrostatic head, bubble tube assemblies have not generally been considered accurate enough for determining the level and density of drilling mud.

SUMMARY OF THE INVENTION

This invention relates to a bubble tube assembly incorporating a diaphragm type pressure regulator that maintains a constant rate of air flow by controlling the output air pressure from the regulator, i.e. the input air pressure to the bubble tube, by using a feedback loop from the bubble tube to the regulator and by conducting the output air pressure from the pressure regulator through a precision, flow limiting orifice before the output air pressure is introduced into the bubble tube.

One aspect of this invention relates to a self-regulating bubble tube assembly that comprises a bubble tube having an open lower end immersed beneath a surface of a fluid. A means is also provided for supplying a constant rate of air flow to the bubble tube despite changes in back pressure within the bubble tube.

Another aspect of this invention relates to a self-regulating bubble tube assembly that comprises a bubble tube having an open lower end immersed beneath a surface of a fluid. A pressure regulator is connected to the bubble tube through a flow limiting orifice for providing a flow of pressurized air to the bubble tube. The pressure regulator is adjustable to provide a variable output air pressure. A feedback loop connects the bubble tube and the pressure regulator to adjust the pressure regulator to change the variable output air pressure from the pressure regulator with changes in back pressure within the bubble tube. An increase in the back pressure within the bubble tube causes an increase in the output air pressure from the pressure regulator and a decrease in the back pressure within the bubble tube causes a decrease in the output air pressure from the pressure regulator.

Yet another aspect of this invention relates to a method of using a bubble tube assembly. The method comprises inserting a bubble tube having an open lower end into a fluid such that the open lower end of the bubble tube is immersed beneath a surface of the fluid, applying a flow of pressurized air to the bubble tube, and maintaining the rate of the air flow to the bubble tube constant despite changes in back pressure within the bubble tube.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
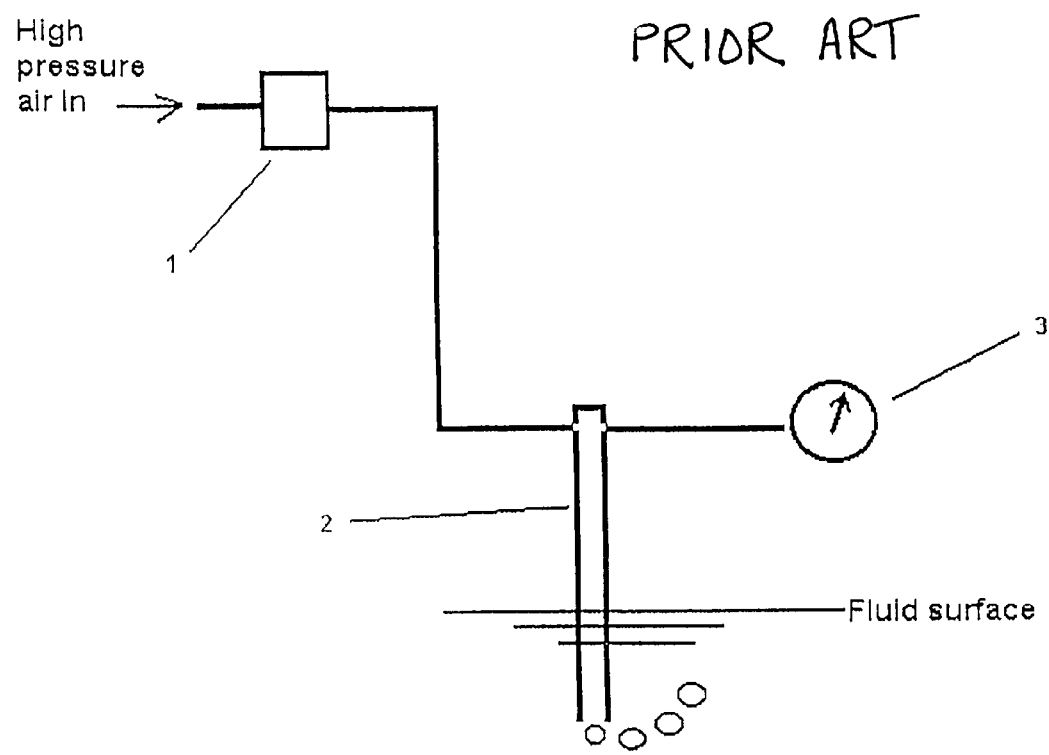
FIG. 1 is a schematic or diagrammatic view of a prior art bubble tube assembly, particularly illustrating the bubble tube assembly being used to determine the level of a fluid.
Figure 2:
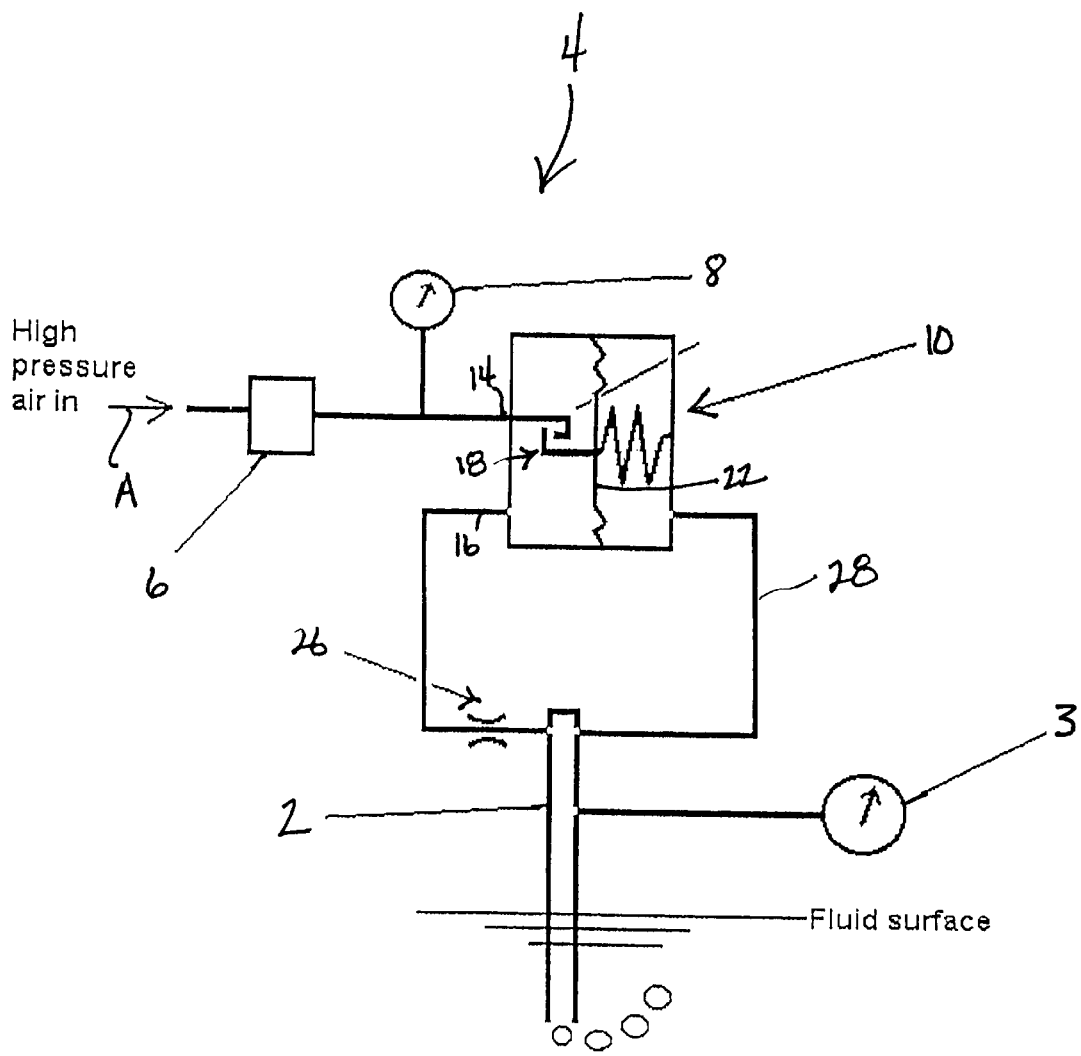
FIG. 2 is a schematic or diagrammatic view of a bubble tube assembly according to this invention, particularly illustrating the bubble tube assembly being used to determine the level of a fluid.

Referring to FIG. 2, a bubble tube assembly according to this invention is illustrated generally as 4. Bubble tube assembly 4 includes a first pressure regulator 6 that is connected to a source of high pressure air which source is represented by the arrow A in FIG. 2. First regulator 6 takes the incoming high pressure air and reduces the pressure to a first lower level, typically 15 psi, which is the highest pressure needed for the particular application in mind. A pressure gauge 8 helps the operator adjust first regulator 6 so that first regulator 6 supplies the desired level of air pressure, i.e. 15 psi in the example described above.

If an air compressor capable of supplying 15 psi is used, then first regulator 6 and pressure gauge 8 could be deleted if so desired. However, since most air compressors supply a minimum air pressure that is significantly more than the desired maximum air pressure needed for the application, it is possible that such higher air pressure might overpressurize and thereby damage a second diaphragm type pressure regulator 10, to be described in more detail below. Thus, the use of first regulator 6 and pressure gauge 8 to reduce the pressure of a pressurized air flow from an air compressor is preferred to avoid damaging second regulator 10.

Figure 3:
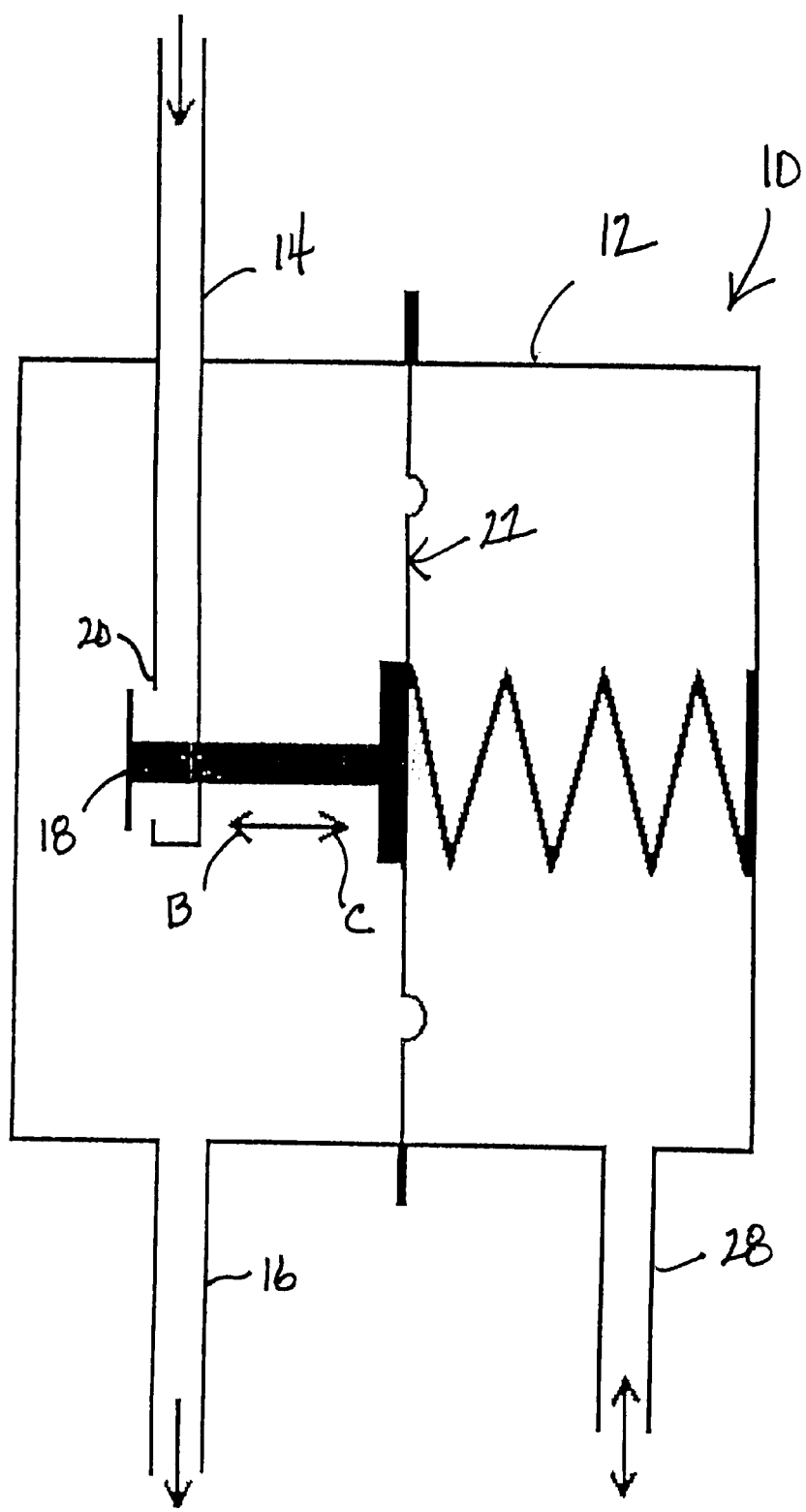
FIG. 3 is a schematic or diagrammatic view of a diaphragm type pressure regulator used as part of the bubble tube assembly of FIG. 2, particularly illustrating how pressure feedback from the bubble tube moves an internal valve within the pressure regulator to vary the air pressure input to the bubble tube.

Referring now both to FIGS. 2 and 3, second regulator 10 includes a housing 12 having an air inlet 14 and an air outlet 16. An adjustable valve 18 is placed in the air flow path between air inlet 14 and air outlet 16. Movement of valve 18 towards or away from a valve seat 20 will cause the air pressure at air outlet 16 to decrease or increase, respectively. In effect, valve 18 simply throttles the incoming flow of air to a greater or lesser extent to regulate the output pressure at air outlet 16 of second regulator 10.

Valve 18 is attached to one side of a flexible diaphragm 22 within housing 12 of second regulator 10. A biasing spring 24 pushes on the side of diaphragm 22 opposite to the side of diaphragm 22 to which valve 18 is attached. Movement of valve 18 towards or away from valve seat 20 is controlled by movement of diaphragm 22 within housing 12. Referring now to FIG. 3, movement of diaphragm 22 towards one wall of housing 12, as depicted by the arrow B in FIG. 3, moves valve 18 away from valve seat 20 to increase the output pressure at air outlet 16 of second regulator 10. Movement of diaphragm 22 towards the opposite wall of housing 12, as depicted by the arrow C in FIG. 3, moves valve 18 towards valve seat 20 to decrease the output pressure at air outlet 16 of second regulator 10. Thus, if a first pressure level of 15 psi is supplied to air inlet 14 of second regulator 10 by the upstream source of such air, namely by the upstream first regulator 6 or directly by an air compressor as the case may be, then second regulator 10 will supply a flow of pressurized air at air outlet 16 which varies in pressure anywhere from the incoming pressure to a much lower pressure. If 15 psi is supplied to second regulator 10 at air inlet 14 thereof, then pressure in a range of from approximately 3 to 15 psi will be supplied at air outlet 16 of second regulator 10, depending upon the position of valve 18 relative to valve seat 20.

In bubble tube assembly 4 of this invention, air outlet 16 of second regulator 10 is connected to the upper end of bubble tube 2 through an air flow path that includes a fixed, small diameter orifice 26. Orifice 26 can have a diameter of 0.015 inches. In addition, the top of bubble tube 2, or any convenient spot on bubble tube 2, is connected by a feedback loop 28 to the spring biased side of diaphragm 22 in second regulator 10. Normally, the spring biased side of diaphragm 22 is connected to atmospheric air pressure, but in this invention it is now connected by feedback loop 28 to back pressure within bubble tube 2.

Referring now to FIG. 2, the addition of orifice 26 and feedback loop 28 provides bubble tube assembly 4 of this invention with significant advantages over the prior art. Bubble tube assembly 4 of this invention is self-regulating to compensate for any changes in back pressure in bubble tube 2 brought on by changes in fluid level or density.

For example, assume that bubble tube assembly 4 shown in FIG. 2 has been installed and is operating to measure the hydrostatic pressure at the lower end of bubble tube 2 by a pressure reading taken at pressure measurement device 3. This hydrostatic pressure measurement can be used to calculate the depth of the fluid within a tank or vessel and could be used, for example, to calculate the depth of drilling mud within a tank or vessel. In a steady state operation, second regulator 10 provides a constant rate of air flow to bubble tube 2. The pressure within bubble tube 2 where air bubbles begin to escape is read by pressure measurement device 3 as a direct measurement of the hydrostatic pressure at the open lower end of bubble tube 2.

If back pressure within bubble tube 2 should fluctuate widely, for whatever reason, this would normally disturb the rate of air flow passing into bubble tube 2 to cause error in the pressure measurement readings. However, in this invention, with the use of fixed orifice 26 and feedback loop 28, fluctuating back pressure within bubble tube 2 is fed back to the spring biased side of diaphragm 22, causing diaphragm 22 to move in whatever direction is needed to compensate. For example, an increase in feedback pressure from bubble tube 2 will press on second regulator 10 diaphragm in the direction of arrow B to further open valve 18, thus increasing the pressure at air outlet 16 of second regulator 10 to maintain a constant rate of air flow to bubble tube 2. Conversely, a reduction of feedback pressure from bubble tube 2 will result in moving diaphragm 22 in the direction of the arrow C to close valve 18, thus decreasing the pressure at air outlet 16 of second regulator 10 in a corresponding manner as needed to maintain a constant rate of air flow to bubble tube 2. Thus, the rate of air flow to bubble tube 2 will remain constant despite changes in back pressures within bubble tube 2.

The advantages of the above are apparent. Bubble tube assembly 4 of this invention will maintain the same rate of air flow to bubble tube 2 despite changes in hydrostatic head brought on by changes in fluid level and density. The low, optimum air flow to bubble tube 2 remains constant and will enable a stable pressure reading well within required operating parameters, even in turbulent conditions. Thus, bubble tube assembly 4 of this invention is more accurate and reliable than prior art bubble tubes.

Another advantage of bubble tube assembly 4 of this invention is what happens if the lower open end of bubble tube 2 becomes obstructed with a piece of debris, such as a piece of congealed fluid or foreign matter. In this event, the resultant increase in back pressure within bubble tube 2 will cause second regulator 10 to admit ever more air pressure to bubble tube 2. The pressure at the output of second regulator 10 will rise until the maximum pressure of second regulator 10 is reached. However, in most cases, the debris will be blown off the lower end of bubble tube 2 before the maximum pressure of second regulator 10 is reached. Thus, bubble tube assembly 4 of this invention tends to be self-cleaning as well as self-regulating. This enhances use of bubble tube assembly 4 in environments where prior art bubble tube assemblies were not used because they were prone to becoming clogged.

Figure 4:
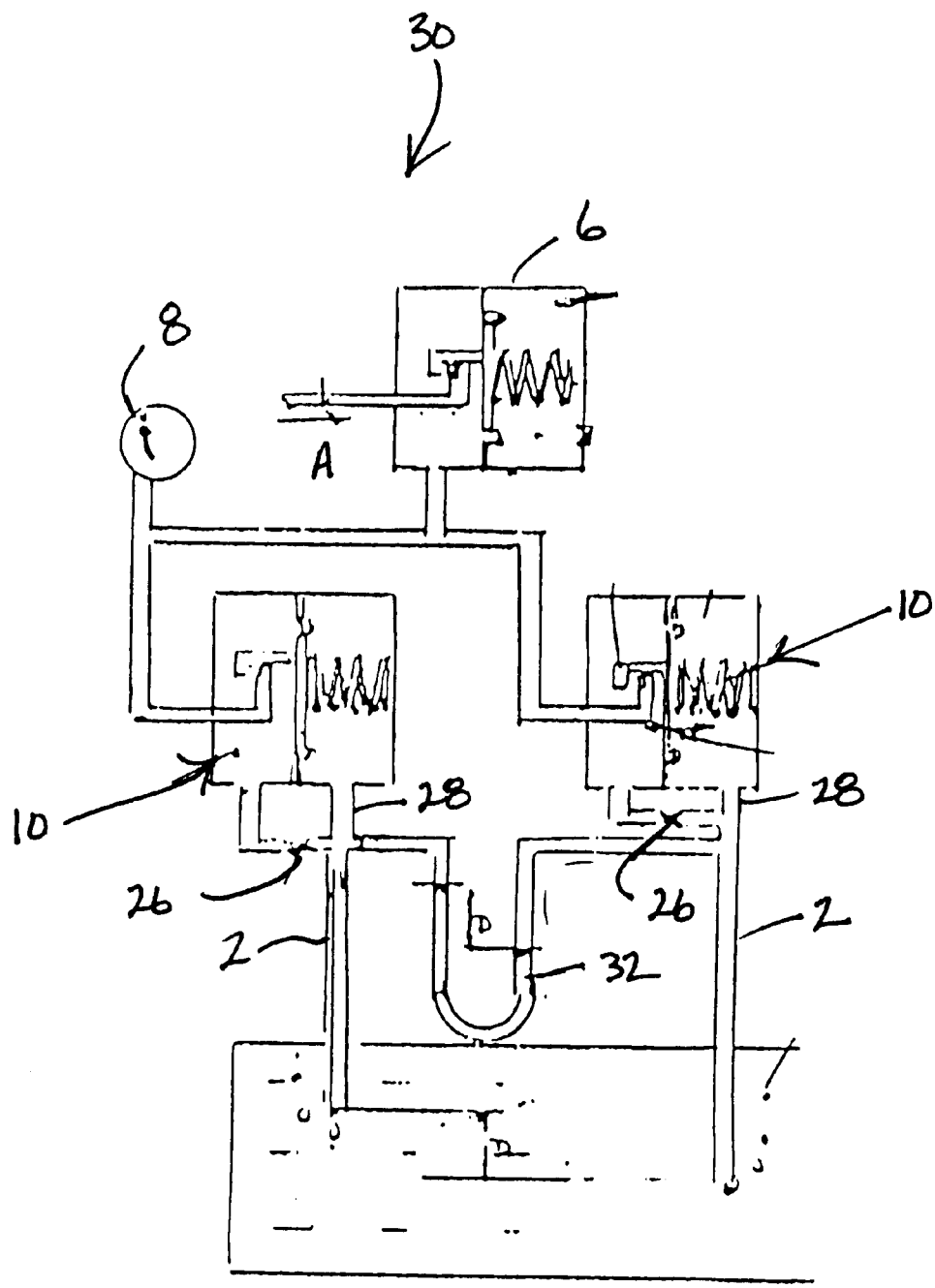
FIG. 4 is a schematic or diagrammatic view of a bubble tube assembly according to this invention, particularly illustrating a pair of bubble tubes being used to determine the level and density of a fluid.

FIG. 4 illustrates another bubble tube assembly 30 according to this invention. This bubble tube assembly 30 includes a pair of bubble tubes 2, one longer than the other, which are immersed beneath the surface of a fluid, such as drilling mud. The distance between the open lower ends of bubble tubes 2 is known. Each bubble tube 2 is connected to its own second regulator 10 as described above to be self-regulating for changes in fluid level or density. Second regulators 10 which feed bubble tubes 2 are supplied with incoming air from first regulator 6. Each bubble tube 2 receives air from its corresponding second regulator 10 through a fixed orifice 26 and is connected back to the spring biased side of its corresponding second regulator 10 by a feedback loop 28, in the manner described with respect to bubble tube assembly 4.

The pair of bubble tubes 2 may be connected to a manometer 32 showing the density of the fluid. Alternatively, manometer 32 is deleted in a typical installation and the hydrostatic pressure within each bubble tube 2 is measured by a pressure transducer or similar pressure measurement device and fed into a computer or other computing device. From this pressure information and from the known distance between the lower ends of bubble tubes 2, the density of the fluid can be easily calculated or computed in a known manner.

The Applicants have discovered that for maximum accuracy the air flow to bubble tube(s) 2 should be as low as practically reliable. Feedback loop 28, which insures a predetermined pressure drop or rate of air flow across orifice 26, allows precise control of the sensing air flow to a practical minimum level.

Various modifications of this invention will be apparent to those skilled in the art. Thus, the scope of this invention is to be limited only by the appended claims.

We claim:

1. A self-regulating bubble tube assembly, which comprises:
    a) a bubble tube having an open lower end immersed beneath a surface of a fluid; and
    b) means for supplying a constant rate of air flow to the bubble tube despite changes in back pressure within the bubble tube by varying input air pressure to the bubble tube in concert with the changes in back pressure within the bubble tube.

2. A self-regulating bubble tube assembly, which comprises:
    a) a bubble tube having an open lower end immersed beneath a surface of a fluid;
    b) a pressure regulator connected to the bubble tube through a flow limiting orifice for providing a flow of pressurized air to the bubble tube, wherein the pressure regulator is adjustable to provide a variable output air pressure; and
    c) a feedback loop connecting the bubble tube and the pressure regulator to adjust the pressure regulator to change the variable output air pressure from the pressure regulator with changes in back pressure within the bubble tube, wherein an increase in the back pressure within the bubble tube causes an increase in the output air pressure from the pressure regulator and a decrease in the back pressure within the bubble tube causes a decrease in the output air pressure from the pressure regulator.

3. The self-regulating bubble tube assembly of claim 2, wherein the flow limiting orifice has a fixed diameter.

4. The self-regulating bubble tube assembly of claim 2, wherein the pressure regulator comprises a diaphragm type pressure regulator.

5. The self-regulating bubble tube assembly of claim 4, wherein the pressure regulator comprises a housing having a diaphragm that moves back and forth within the housing, a valve attached to one side of the diaphragm for varying the output air pressure, and a biasing spring bearing against a side of the diaphragm opposite to the one side of the diaphragm to which the valve is attached, and wherein the feedback loop connects the bubble tube to the housing for conducting the back pressure within the bubble tube to the spring biased side of the diaphragm.

6. The self-regulating bubble tube assembly of claim 5, further including a pressure measurement device connected to the bubble tube to provide a reading of hydrostatic pressure being exerted by the fluid at the open lower end of the bubble tube.

7. The self-regulating bubble tube assembly of claim 2, further including a pressure measurement device connected to the bubble tube to provide a reading of hydrostatic pressure being exerted by the fluid at the open lower end of the bubble tube.

8. The self-regulating bubble tube assembly of claim 7, wherein a single bubble tube is connected to the pressure regulator such that the hydrostatic pressure being read from the pressure measurement device can be used to determine the level of a fluid of known density.

9. The self-regulating bubble tube assembly of claim 7, wherein two bubble tubes having unequal lengths are used with the distance between the open lower ends of the bubble tubes being known, wherein each bubble tube is connected by a feedback loop to a separate, independent, adjustable pressure regulator such that the hydrostatic pressure at the open lower end of each bubble tube can be used to determine the density of the fluid.

10. The self-regulating bubble tube assembly of claim 7, wherein the fluid is drilling mud.

11. The self-regulating bubble tube assembly of claim 2, wherein the fluid is drilling mud.

12. A method of using a bubble tube assembly, which comprises:
    a) inserting a bubble tube having an open lower end into a fluid such that the open lower end of the bubble tube is immersed beneath a surface of the fluid;
    b) applying a flow of pressurized air to the bubble tube; and
    c) maintaining the rate of the air flow to the bubble tube constant despite changes in back pressure within the bubble tube by varying input air pressure to the bubble tube in concert with the changes in back pressure within the bubble tube.

13. The method of claim 12, further including measuring pressure within the bubble tube to measure the hydrostatic pressure of the fluid at the open lower end of the bubble tube.

14. The method of claim 13, wherein the fluid comprises a drilling mud.

* * * * *